United States Patent [19]
Kim

[11] Patent Number: 5,995,656
[45] Date of Patent: Nov. 30, 1999

[54] IMAGE ENHANCING METHOD USING LOWPASS FILTERING AND HISTOGRAM EQUALIZATION AND A DEVICE THEREFOR

[75] Inventor: Yeong-taeg Kim, Suwon, Rep. of Korea

[73] Assignee: Samsung Electronics Co., Ltd., Kyungki-do, Rep. of Korea

[21] Appl. No.: 08/857,823

[22] Filed: May 16, 1997

[30] Foreign Application Priority Data

May 21, 1996 [KR] Rep. of Korea ............... 96-17209

[51] Int. Cl.$^6$ .................................................. G06K 9/00
[52] U.S. Cl. ................................. 382/169; 382/264
[58] Field of Search ............................ 382/264, 169, 382/260, 274, 168

[56] References Cited

U.S. PATENT DOCUMENTS

| | | | |
|---|---|---|---|
| 4,825,297 | 4/1989 | Fuchsberger et al. | 358/284 |
| 5,317,427 | 5/1994 | Ichikawa | 358/520 |
| 5,467,404 | 11/1995 | Vuylsteke et al. | 382/274 |
| 5,550,888 | 8/1996 | Neitzel et al. | 378/28.7 |

OTHER PUBLICATIONS

Rafael C.Gonzalez and Richard C.Woods, "Digital Image Processing", Addison–Wesley Publishing Company, pp.173–180, 1992.

Zhu Yu–Cheng et al., "A Human Visual Model Based Image Histogram Modification Technique" Proceedings of the International Conference on Systems, Man, and Cybernetics, Beijing and Shenyang, Aug. 8–12, 1988, vol. 1.

Leszcynski K. W. et al., "Digital Contrast Enhancement for Online Portal Imaging", *Medical and Biological Engineering and Computing*, Vo. 27, No. 5, Sep. 1989, pp. 507–512, XP000046396, paragraph 2.1.2.

*Primary Examiner*—Phuoc Tran
*Attorney, Agent, or Firm*—Sughrue, Mion, Zinn, Macpeak & Seas, PLLC

[57] ABSTRACT

In an image enhancing method, an input image signal is lowpass filtered and then histogram equalized to become a contrast-enhanced signal. The lowpass filtered signal is subtracted from the input image signal. Afterwards, the subtracted value is added to the contrast enhanced signal, and the added result is output as an image enhanced output signal. The contrast of a given image signal is improved without an increase in background noise.

11 Claims, 2 Drawing Sheets

IMAGE ENHANCING METHOD USING LOWPASS FILTERING AND HISTOGRAM EQUALIZATION AND A DEVICE THEREFOR

BACKGROUND OF THE INVENTION

1. Field of the Invention

The present invention relates to an image enhancing method and device, and more particularly, to an image enhancing method for enhancing the contrast of an image without an increase in noise and a device for performing the image enhancing method.

2. Description of the Related Arts

A histogram of a gray level provides an overall description of the appearance of an image. Properly adjusted gray levels for a given image can enhance the appearance or contrast of the image.

Among many methods for contrast enhancement, the most widely known is the histogram equalization method, in which the contrast of a given image is enhanced according to the sample distribution thereof. The method is disclosed in documents: [1] J. S. Lim, "Two-dimensional Signal and Image Processing," Prentice Hall, Englewood Cliffs, N.J. 1990, and [2] R. C. Gonzalez and P. Wints, "Digital Image Processing," Addison-Wesley, Reading, Mass., 1977.

Also, the useful applications of the histogram equalization method for medical image processing and radar image processing are disclosed in documents: [3] J. Zimmerman, S. Pizer, E. Staab, E. Perry, W. McCarteney and B. Brenton, "Evaluation of the Effectiveness of Adaptive Histogram Equalization for Contrast Enhancement," IEEE Tr. on Medical Imaging, pp. 304–312, Dec. 1988, and [4] Y. Li, W. Wang and D. Y. Yu, "Application of Adaptive Histogram Equalization to X-ray Chest Image," Proc. of the SPIE, pp. 513–514, vol. 2321, 1994.

In general, since the histogram equalization causes the dynamic range of an image to be stretched, the density distribution of the resultant image is made flat so that the contrast of the image is enhanced as a consequence thereof.

However, the histogram equalization method causes problems in some practical cases. That is, since the contrast is enhanced by stretching the dynamic range, background noise is simultaneously increased by the equalization. Thus, the equalization may cause degradation of image quality in a region having a constant level.

SUMMARY OF THE INVENTION

To solve the above problem, an object of the present invention is to provide an image enhancing method for enhancing the contrast of an image including Gaussian noise while preventing a simultaneous increase in noise by lowpass filtering the input image and histogram-equalizing the lowpass filtered signal.

Another object of the present invention is to provide an image enhancing device for enhancing the contrast of an image including Gaussian noise while preventing an increase in noise by lowpass filtering the input image and histogram-equalizing the lowpass filtered signal.

To achieve the above-noted objects, there is provided an image enhancing method which includes histogram-equalizing an image signal represented by a predetermined number of gray levels, comprising the steps of (a) lowpass filtering an input image signal to output a lowpass filtered signal; (b) histogram equalizing the lowpass filtered signal to output a contrast-enhanced signal; (c) subtracting the lowpass filtered signal from the input image signal; and (d) outputting a signal produced by adding the subtracted value in the step (c) to the contrast enhanced signal.

Further according to the present invention, there is provided an image enhancing device for histogram equalizing an image signal represented by a predetermined number of gray levels, comprising a lowpass filtering device for lowpass filtering an input image signal and outputting a lowpass filtered signal; a histogram equalizing device for histogram equalizing the lowpass filtered signal and outputting a contrast enhanced signal; a detector for detecting the difference between the input signal and the lowpass filtered signal; and an output for adding the detected difference value to the contrast enhanced signal to output the added result as an output signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
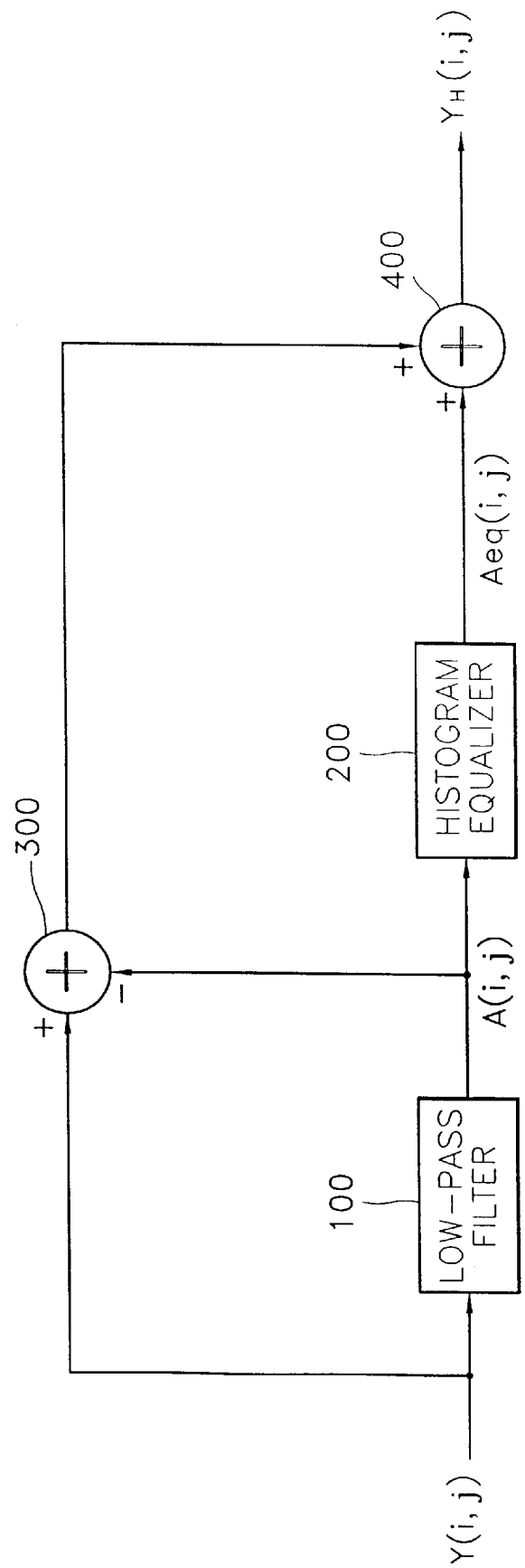
FIG. 1 is a block diagram of an image enhancing device using lowpass filtering and histogram equalization according to the present invention.

First, the image quality improving method according to the present invention will be described.

Assume that $\{Y(i,j)\}$ denotes an input image composed of L gray levels $\{X_0, X_1, \ldots, X_{L-1}\}$, and $\{A(i,j)\}$ denotes a lowpass filtered image signal of the input image $\{Y(i,j)\}$.

Also, assume that $A_{eq}(i,j)$ denotes a lowpass filtered image signal (hereinafter, referred to as "an improved signal") whose contrast is improved compared with input image $\{Y(i,j)\}$ using the histogram equalization, and $Y_H(i,j)$ denotes a final output signal.

The contrast improving method using histogram equalization involves a typical histogram equalization technique wherein a cumulative density function (CDF) of a given image sample is used in a conversion function. However, the present invention can also be employed in applications using a modified histogram equalization other than the typical histogram equalization method.

The final output signal $Y_H(i,j)$ is obtained by subtracting the lowpass filtered signal $A(i,j)$ from the input signal $Y(i,j)$ and adding the result to the improved signal $A_{eq}(i,j)$, which is expressed in a following equation (1).

$$YH(i,j) = A_{eq}(i,j) + (Y(i,j) - A(i,j)) \tag{1}$$

Here, $Y(i,j) - A(i,j)$ corresponds to the high frequency component of the original input image signal.

The basic concept and utility of the present invention will be easily understood in view of the following equation which is formed by changing equation (1).

$$Y_H(i,j) - A_{eq}(i,j) = Y(i,j) - A(i,j) \tag{2}$$

The above equation (2) implies that the difference between the final output signal $Y_H(i,j)$ and the improved signal $A_{eq}(i,j)$ is equal to that between the input signal $Y(i,j)$ and the lowpass filtered signal.

That is, the difference between two different input samples which result in the same lowpass filtered value is the same as that between the output signals corresponding to the input samples.

In other words, when two adjacent samples in an image region having a constant signal level have different values due to Gaussian noise, the difference between the two samples remains the same at the output ends of the present invention in the case that the lowpass filtered values of the two samples are equal to each other. Thus, the present invention prevents an increase in noise when the contrast of the image is improved by the histogram equalization.

It is well known that if an image signal having a constant signal level includes Gaussian noise, the constant signal level can be extracted by lowpass filtering the image signal.

To give a further detailed description, assume that the input samples $Y(i,j)$ and $Y(I',j')$ result in the same lowpass filtered value. That is, $A(i,j)$ is equal to $A(I',j')$, which makes $A_{eq}(i,j)$ equal to $A_{eq}(I',j')$.

Then, the output signals corresponding to $Y(i,j)$ and $Y(I',j')$ are given as follows, respectively.

$$YH(i,j)=Aeq(i,j)+(Y(i,j)-A(i,j)) \quad (3)$$

$$Y_H(I',j')=Aeq(I',j')+(Y(I',j')-A(I',j')) \quad (4)$$

Using the relationships that $A(i,j)$ equals $A(I',j')$ and $A_{eq}(i,j)$ equals $A_{eq}(I',j')$, the following equation can be obtained.

$$Y_H(i,j)-Y_H(I',j')=Y(I',j')-Y(I',j') \quad (5)$$

Equation (5) indicates that the difference between the two input samples is the same as that between the corresponding output signals. Thus, an increase in noise is prevented during the enhancement of contrast using the histogram equalization.

Next, a typical histogram equalization algorithm will be described to facilitate an understanding of the present invention.

It is assumed that the given input image $\{A(i,j)\}$ is composed of L discrete gray levels $\{X_0, X_1, \ldots X_{L-1}\}$, where $X_0=0$ represents a black level, and $X_0=1$ represents a white level. A probability density function (PDF) for $\{A(i,j)\}$ is defined as follows.

$$p(X_k)=n_k/n \quad (6)$$

Here, $p(X_k)$ is a probability in which the K-th gray level $X_k$ appears in the input image $\{A(i,j)\}$, $n_k$ denotes the number of occurrences of the gray level $X_k$ in the input image $\{A(i,j)\}$, and n denotes the total number of samples in $\{(A(i,j)\}$.

Also, a cumulative density function (CDF) is defined as follows.

$$c(X_k) = \sum_{j=0}^{k} p(X_j) \quad (7)$$

On the basis of the cumulative density function, the output $A_{eq}(i,j)$ of the typical histogram equalization with respect to the given input signal $A(i,j)$ is given by following equation.

$$A_{eq}(i,j)=c(A(i,j)XL-1) \quad (8)$$

where, $A(i,j)\in\{X_0,X_1,\ldots X_{L-1}\}$.

Now, a preferred embodiment of the image enhancing device using lowpass filtering and histogram equalization according to the present invention will be explained with reference to FIGS. 1 and 2.

Referring to FIG. 1, a lowpass filter 100 receives an input signal $Y(i,j)$ and carries out lowpass filtering of such signal to output a lowpass filtered signal $A(i,j)$.

A histogram equalizer 200 equalizes the lowpass filtered signal $A(i,j)$ output by the lowpass filter 100, thereby enhancing image contrast of the lowpass filtered signal.

A subtractor 300 subtracts the lowpass filtered signal $A(i,j)$ output by the lowpass filter 100 from the input signal $Y(i,j)$. An adder 400 adds an improved signal $A_{eq}(i,j)$ output by the histogram equalizer 200 to the output of the subtractor 300 and outputs a final output signal $Y_H(i,j)$ which is expressed by equation (1).

Figure 2:
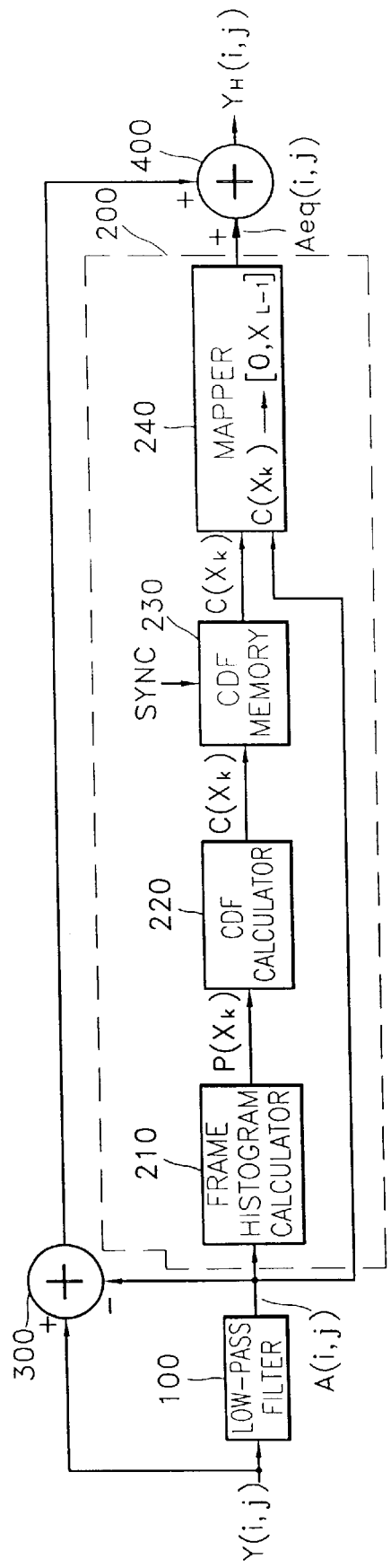
FIG. 2 is a detailed block diagram of the image enhancing device of FIG. 1 according to an embodiment of the present invention.

FIG. 2 is a detailed block diagram of the device shown in FIG. 1, in which a typical histogram equalization method is employed. In FIG. 2, the same reference numerals are designated to components which are similar to those shown in FIG. 1, and the description will be focused on the histogram equalizer 200.

The histogram equalizer 200 includes a frame histogram calculator 210, a CDF calculator 220, a CDF memory 230 and a mapper 240.

The frame histogram calculator 210 receives the lowpass filtered signal $A(i,j)$ (which can also be denoted by $X_k$) output by the lowpass filter 100 in a picture unit, and calculates the probable density function $p(X_k)$ which represents a gray level distribution in the lowpass filtered signal $X_k$ according to equation (6) by a unit of a picture. In the present embodiment, one frame is used for the picture unit. However, one field may be used for the picture unit, alternatively.

A CDF calculator 220 receives the probability density function $p(X_k)$ output by the frame histogram calculator 210 and calculates a cumulative density function $c(X_k)$ according to equation (7).

A CDF memory 230 stores the cumulative density function $c(X_k)$ calculated by the CDF calculator 220 by a unit of one frame, updates the stored value in response to a synchronization signal SYNC, and outputs a cumulative density function value $c(X_k)$ corresponding to an input sample $X_k$ stored one frame before. A field sync signal is used for the synchronization signal SYNC when the picture unit is one field, while a frame sync signal is used for the synchronization signal SYNC when the picture unit is one frame. The CDF memory 230 is also used as a buffer.

The mapper 240 reads out the cumulative density function value $c(X_k)$, which corresponds to the lowpass filtered signal $X_k$ output by the lowpass filter 100, but is delayed by one frame, from the CDF memory 230 and maps the lowpass filtered signal $X_k$ into a gray level of $X_0$ to $X_m$ according to equation (8).

A frame memory can be further included in the histogram equalizer 200 for delaying the lowpass filtered signal $X_k$, output by the lowpass filter 100 by one frame, so that a signal in the same frame as the cumulative density function value output by the CDF calculator 220 is input to the mapper 240.

The present invention can be applied in many fields associated with the improvement of image signal quality, such as broadcasting equipment, radar signal processing, medical engineering, and consumer electronics.

As described above, the present invention lowpass filters an input signal and histogram equalizes the lowpass filtered signal so that image contrast is improved while preventing an increase in noise.

While only certain embodiments of the invention have been specifically described herein, it will apparent that numerous modifications may be made thereto without departing from the spirit and scope of the invention.

What is claimed is:

1. An image enhancing method for histogram-equalizing an image signal represented by a predetermined number of gray levels, comprising the steps of:

(a) lowpass filtering an input image signal to output a lowpass filtered signal;

(b) histogram equalizing said lowpass filtered signal to output a contrast-enhanced signal;

(c) subtracting said lowpass filtered signal from said input image signal to obtain a subtracted value; and (d) outputting a signal produced by adding said subtracted value to said contrast-enhanced signal.

2. The image enhancing method as claimed in claim 1, wherein said step (b) comprises the steps of:

calculating a probability density function which represents a gray level distribution of said lowpass filtered signal by a picture unit;

calculating a cumulative density function on the basis of said probability density function; and mapping said lowpass filtered signal into a gray level according to said cumulative density function.

3. The image enhancing method as claimed in claim 1, wherein the difference between said output signal and said contrast enhanced signal is the same as the difference between said input image signal and said lowpass filtered signal.

4. An image enhancing device for histogram equalizing an image signal represented by a predetermined number of gray levels, comprising:

means for lowpass filtering an input image signal and for outputting a lowpass filtered signal;

means for histogram equalizing said lowpass filtered signal and for outputting a contrast enhanced signal;

means for detecting a difference between said input image signal and said lowpass filtered signal; and means for adding a difference value to said contrast enhanced signal and outputting an added result as an output signal.

5. The image enhancing device as claimed in claim 4, wherein said means for histogram equalizing comprises:

first calculating means for receiving said lowpass filtered signal and for calculating a probability density function which represents a gray level distribution in said lowpass filtered signal by a picture unit;

second calculating means for calculating a cumulative density function on the basis of said probability distribution function; and means for mapping said lowpass filtered signal into a gray level according to said cumulative density function value.

6. The image enhancing device as claimed in claim 5, further comprising a picture memory for delaying said lowpass filtered signal by one frame to output a signal in the same frame as said cumulative density function value output by said second calculating means.

7. The image enhancing device as claimed in claim 5, further comprising a buffer for storing cumulative density function values calculated by said second calculating means by a picture unit, updating stored values in response to a synchronization signal, and outputting a cumulative density function value, stored one frame before, to said mapping means.

8. An image enhancing device for histogram equalizing an image signal represented by a predetermined number of gray levels, comprising:

a lowpass filter which lowpass filters an input image signal and outputs a lowpass filtered signal;

a histogram equalizer for histogram equalizing said lowpass filtered signal and for outputting a contrast enhanced signal;

a subtractor for determining a difference between said input image signal and said lowpass filtered signal; and an adder for adding a difference value to said contrast enhanced signal and outputting an added result as an output signal.

9. The image enhancing device as claimed in claim 8, wherein said histogram equalizer comprises:

first calculating means for receiving said lowpass filtered signal and for calculating a probability density function which represents a gray level distribution in said lowpass filtered signal by a picture unit;

second calculating means for calculating a cumulative density function on the basis of said probability distribution function; and a mapper for mapping said lowpass filtered signal into a gray level according to said cumulative density function value.

10. The image enhancing device as claimed in claim 9, further comprising a picture memory for delaying said lowpass filtered signal by one frame to output a signal in the same frame as said cumulative density function value output by said second calculating means.

11. The image enhancing device as claimed in claim 9, further comprising a buffer for storing cumulative density function values calculated by said second calculating means by a picture unit, updating stored values in response to a synchronization signal, and outputting a cumulative density function value, stored one frame before, to said mapper.

* * * * *